United States Patent [19]
Marler et al.

[11] Patent Number: 5,647,081
[45] Date of Patent: *Jul. 15, 1997

[54] MANUAL HYDRAULIC DOCK BOARD HOLD DOWN ARRANGEMENT

[76] Inventors: Arnold Harvey Marler, 345 Silverstone Dr., Rexdale, Ontario, Canada, M9V 3J8; Stanley Allen Marler, 39 Goodfellow Crescent, Bolton, Ontario, Canada, L7E 5X5

[*] Notice: The term of this patent shall not extend beyond the expiration date of Pat. No. 5,551,113.

[21] Appl. No.: 539,064

[22] Filed: Oct. 4, 1995

Related U.S. Application Data

[63] Continuation-in-part of Ser. No. 161,253, Dec. 3, 1993, Pat. No. 5,551,113.

[30] Foreign Application Priority Data

Oct. 6, 1994 [CA] Canada ................................. 2133775

[51] Int. Cl.⁶ ....................................................... E01D 1/00
[52] U.S. Cl. ............................................................ 14/71.7
[58] Field of Search .................................. 14/71.1, 71.3, 14/71.5, 71.7

[56] References Cited

U.S. PATENT DOCUMENTS

| | | | |
|---|---|---|---|
| 3,656,199 | 4/1972 | Bregantin | 14/71.7 |
| 4,091,488 | 5/1978 | Artzberger | 14/71.7 |
| 4,619,008 | 10/1986 | Kovach et al. | 14/71.7 |
| 5,551,113 | 9/1996 | Marler et al. | 14/71.7 |

*Primary Examiner*—William P. Neuder

[57] ABSTRACT

A hydraulic hold down locking cylinder is disclosed by replacing mechanical lock arrangements commonly used on less expensive dock boards. This arrangement provides superior performance, reliability, and lower maintenance. In the preferred form all components are provided in a cylindrical casing which is mounted as a variable length locking link in the dock board.

20 Claims, 4 Drawing Sheets

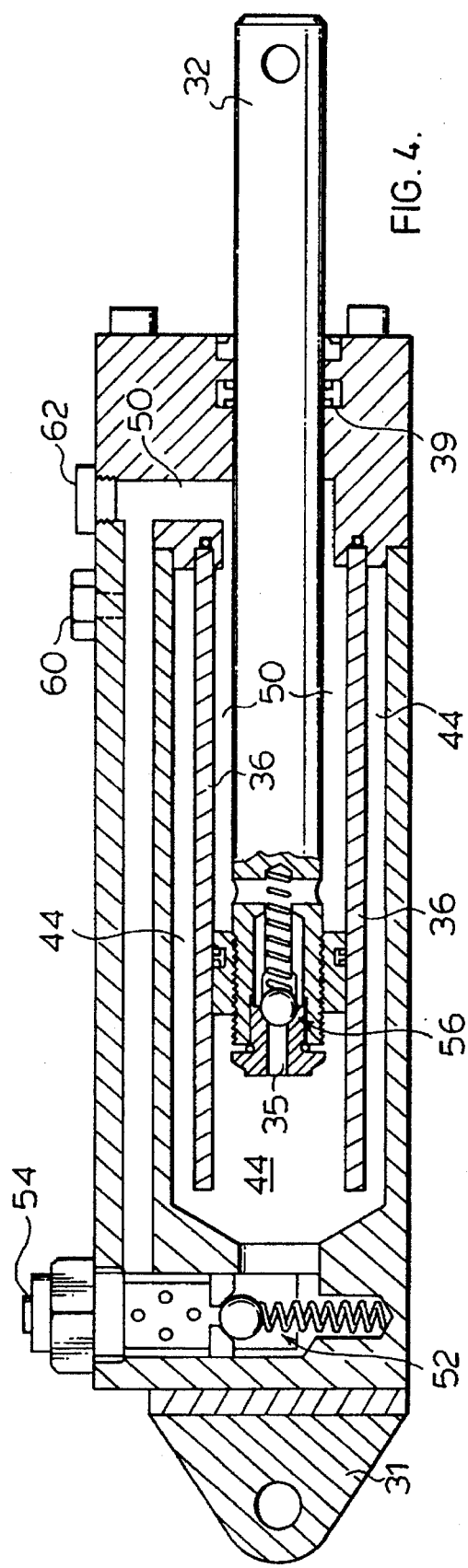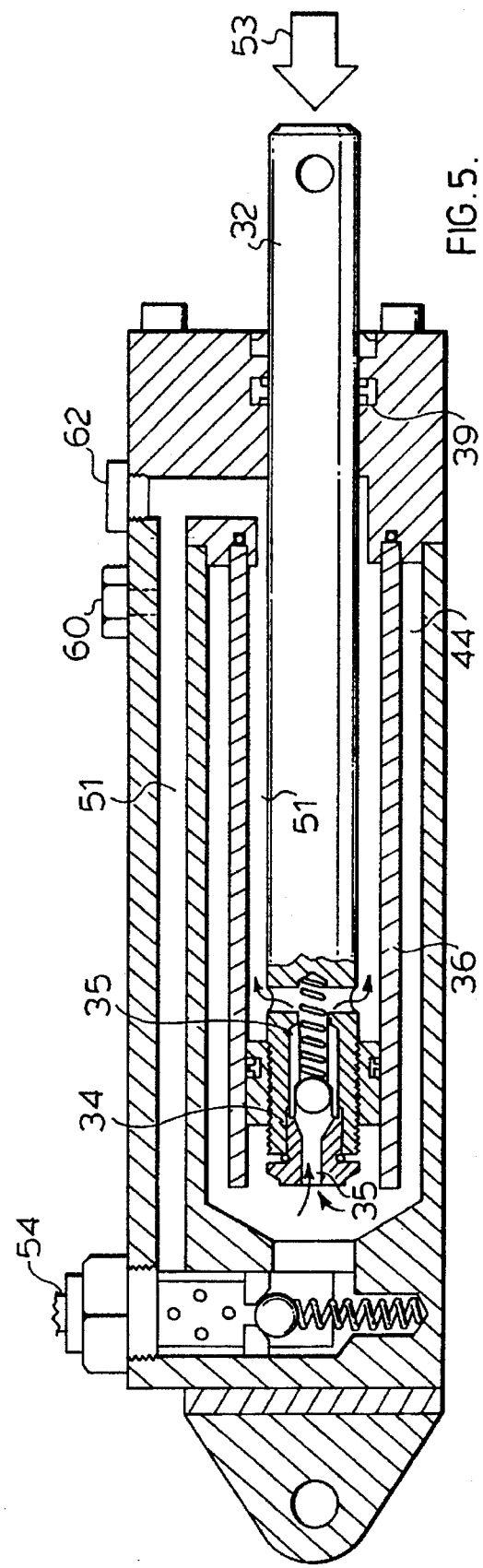

MANUAL HYDRAULIC DOCK BOARD HOLD DOWN ARRANGEMENT

CROSS-REFERENCE TO RELATED APPLICATIONS

This application is a continuation-in-part of application Ser. No. 08/161,253, filed Dec. 3, 1993, which issued as U.S. Pat. No. 5,551,113.

FIELD OF THE INVENTION

The present invention relates to a manual lock arrangement for a mechanical dock board and, in particular relates to a manual hydraulic lock arrangement.

BACKGROUND OF THE INVENTION

There are many dock board systems which have a mechanical arrangement for raising and lowering thereof and generally include a mechanical lock arrangement for locking the dock board in a particular position. Unfortunately, the loads exerted on the dock boards, and hence on the mechanical arrangements, change and, in particular, change due to the variable load or support the trailer bed exerts on the dock board as the trailer is being loaded or unloaded.

Problems occur when a trailer is unloaded in that the suspension of the trailer tends to raise the bed of the trailer and the dock board. The mechanical lock arrangement of the locked dock board tries to oppose this upward force and movement. This can result in very high loads on the dock board and causes high wear and deterioration of the mechanical lock. These lock mechanisms also become progressively more difficult to release as the load on the dock board increases and can lead to operator injury. The release problem is more acute if high upward loads are present, such as when a trailer is unloaded.

The unloading or loading of trailers typically involves a fork lift truck or other device which weighs 3000 to 5000 lbs. or more without the weight of the product. This causes the dock board and trailer to go down when the fork lift truck crosses the dock board, and the dock board and trailer should go up when the fork lift truck crosses over the dock board from the trailer. Thus, the forces exerted on the dock board vary widely during use.

Many mechanical dock board systems, as opposed to powered hydraulically controlled dock boards (having pumps and electrically controlled valves), are used in factories as they are generally less expensive and, typically, the owner of the building is not responsible for maintenance of the dock boards. This responsibility is typically the responsibility of the tenant renting the premises.

There remains a need for a simple arrangement for effectively locking the manual mechanical type dock boards in various positions while accommodating the variable forces thereon.

The present invention is directed to nonpowered, manual mechanical type dock boards and is not directed to powered hydraulic dock boards which are many times more expensive and require power at the dock board.

SUMMARY OF THE INVENTION

According to the present invention, the mechanical lock of a loading dock is replaced with a hydraulic locking arrangement. The hydraulic locking arrangement allows the dock plate to move downwardly when any force is applied to the dock plate which is of a sufficient magnitude to overcome the spring bias urging the dock plate to a raised position. The hydraulic locking arrangement locks the dock plate against upward movement until a predetermined pressure is exceeded. The locking cylinder comprises a moveable piston, a high pressure hydraulic fluid circuit acting on one side of the piston for opposing movement of the piston in a direction to raise said dock plate, a hydraulic fluid reservoir, a high pressure check valve arrangement connecting the high pressure hydraulic fluid circuit with the reservoir. The high pressure check valve arrangement opens to the reservoir and when a predetermined pressure is exceeded, the check valve opens and allows some of the hydraulic fluid to be returned to the reservoir. This typically occurs when the dock board is urged upwardly by a trailer bed which is being unloaded. Once the pressure has been relieved, the check valve closes and the hydraulic locking cylinder again locks the dock board in place. The hydraulic locking cylinder includes a low pressure check valve arrangement for accommodating movement of the piston within the cylinder in response to lowering of the dock board. In this way, any force of a magnitude exceeding the spring pressure urging the dock board to pivot downwardly, causes the dock board to move downwardly in a controlled manner due to the hydraulic fluid passing through the low pressure check valve. Once the dock board assumes new working positions, the cylinder is essentially locked until the high pressure check valve pressure is exceeded or the dock board moves downwardly. The hydraulic fluid within the circuit will be at different pressures depending primarily on the variation in an upward forces exerted on the dock board. The hydraulic locking cylinder also includes a manual release means for the high pressure check valve arrangement to allow the cylinder to accommodate controlled movement of the dock platform to the raised position under the influence of the spring bias. This raised position is typically used as a standby position until such time as a trailer bed has been positioned in front of the dock board. The user can then walk on to the dock plate, overcome the spring bias of the dock board and the dock plate will move downwardly until it bottoms out on the bed of the trailer. The dock plate is locked against upward movement by the hydraulic locking cylinder (i.e. the trapped hydraulic fluid in the circuit between the piston and the high pressure check valve).

It has been found that the locking arrangement of the invention can replace the troublesome mechanical locking arrangement found with many mechanical dock boards and provide superior performance.

The dock board also "floats" or constantly adjusts during use thereof to accommodate the varying loads exerted thereon during loading or unloading of a trailer or vehicles.

These advantages are achieved in a manual nonpowered dock board in an effective, reliable manner and provide an extremely effective alternative to manual mechanical hold down mechanisms.

BRIEF DESCRIPTION OF THE DRAWINGS

Preferred embodiments of the invention are shown in the drawings wherein:

FIG. 4 is a sectional view showing the locking cylinder in a stationary position;

FIG. 5 is a sectional view showing the locking cylinder when a force is being exerted on the cylinder rod in a retraction direction (downward movement of the dock board)

DETAILED DESCRIPTION OF THE PREFERRED EMBODIMENTS

Figure 1:
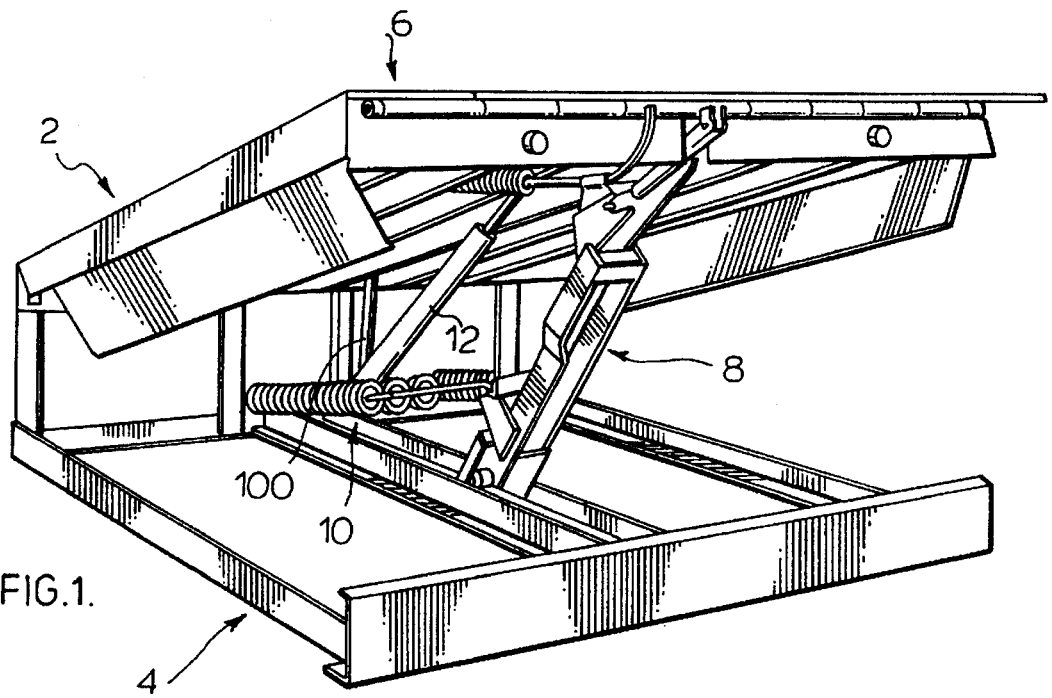
FIG. 1 is a perspective view of a mechanical dock board with the hydraulic cylinder locking arrangement.

One example of an adjustable mechanical loading dock 2 is shown in FIG. 1. The loading dock includes a frame 4, a pivoting dock board 6 and a mechanical linkage generally shown as 8 for controlling movement of the pivoting dock board 6. A spring bias arrangement 10 urges the dock board to a raised position as shown in FIG. 1. The spring bias arrangement 10 can be set such that a operator can stand on the dock board 6 and cause the dock board to move downwardly.

Figure 2:
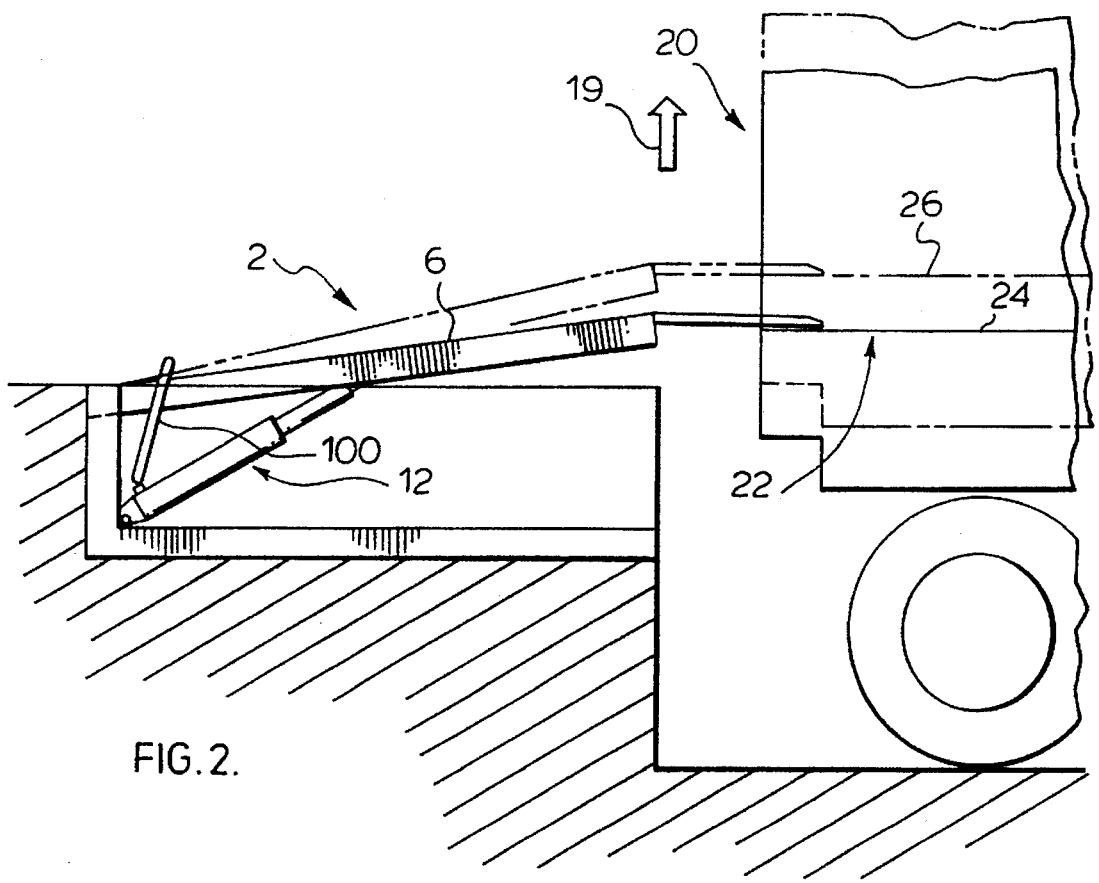
FIG. 2 is a side view of a dock board located in a pit and co-operating with the bed of a trailer.

As shown in FIG. 2, the dock board 6 is moved downwardly until it comes into contact with the bed of a trailer generally shown as 22. If the operator's weight is removed, the spring bias arrangement, if unopposed, would return the dock board to a raised position. To overcome this, the hydraulic locking cylinder 12 opposes any upward movement of the dock board 6. As will be explained in greater detail with respect to FIGS. 3, 4 and 5, the hydraulic locking cylinder has a release mechanism should the pressure exerted on the dock board in an upward direction exceed a predetermined force. It is this upward force which has been the source of significant problems with respect to mechanical locking arrangements resulting in these locking arrangements typically failing or requiring a high degree of maintenance due to excessive wear.

The upward force, generally indicated as 19 in FIG. 2, is caused by a trailer generally shown as 20 being unloaded with the dock board in contact with the bed 22 of the trailer. As the trailer is unloaded, the suspension of the trailer tends to raise the bed 22 from an initial level generally indicated as 24 to a raised level indicated as 26. This provides a strong load on the dock board urging it to move in the upward direction. With the present hydraulic arrangement, when the upward force exceeds a predetermined limit (preferably about 1000 psi), a high pressure check valve is opened and allows the dock board to move upwardly and assume a new locked position. Thus, the hydraulic locking cylinder arrangement allows the dock board to generally move in a controlled manner downwardly and provides a progressive lock against upward movement.

Loading or unloading of a trailer typically requires a fork lift truck or other heavy device to cross the dock board. This results in high downward loads when the fork lift truck is on the dock board, which is opposed by the suspension of the trailer, however, the dock board and trailer move downwardly. As the fork lift truck leaves a trailer and leaves the dock board, the trailer exerts a high upward load on the dock board. Typically, this load is of sufficient magnitude to exceed the pressure limit of the high pressure check valve, such that the dock board moves upwardly, relieving the force.

In this way, the dock board moves down and then up or "floats" to accommodate the actual forces encountered. This results in a dock board which automatically adjusts to maintain the forces exerted thereon with a satisfactory operating range.

Figure 3:
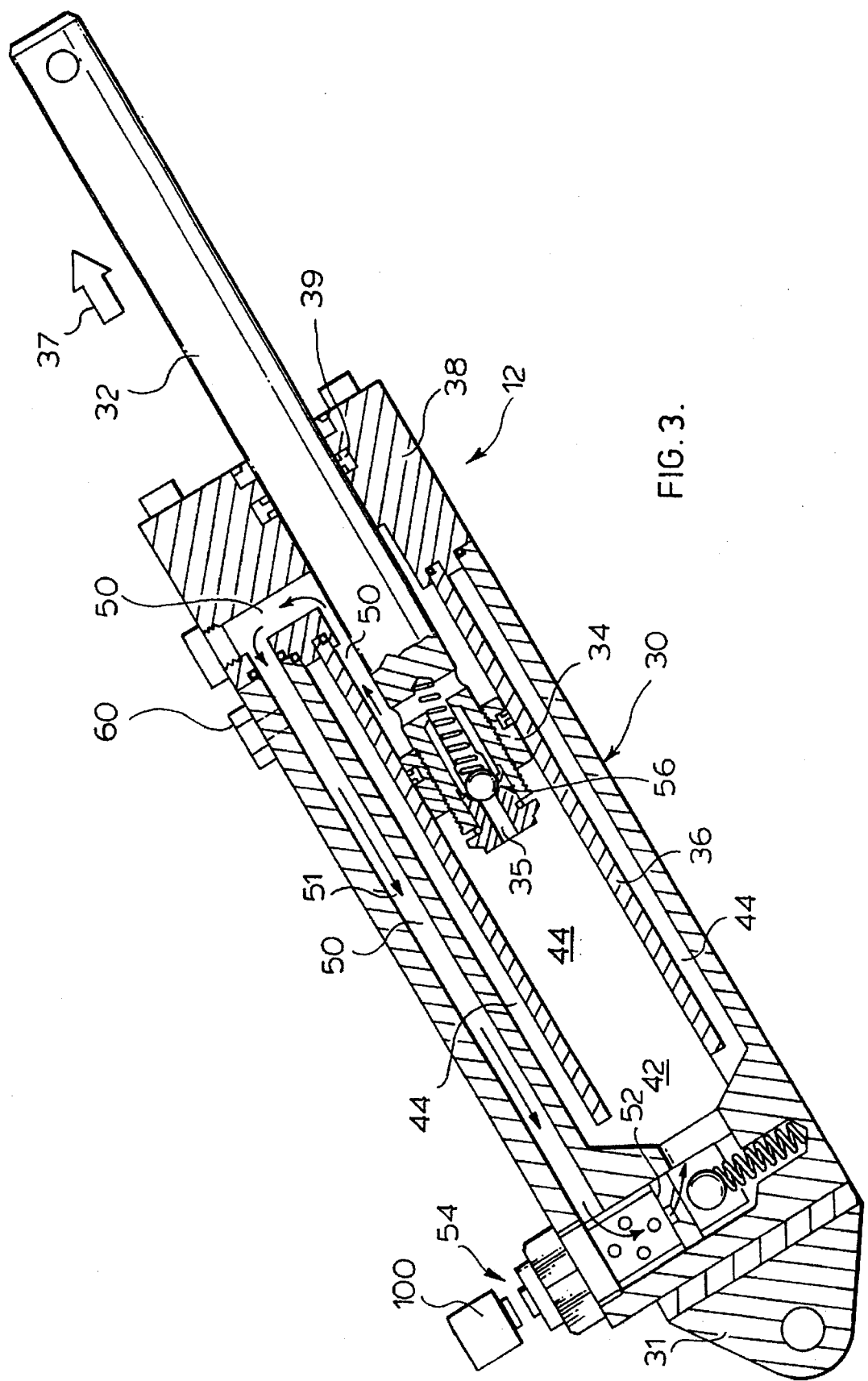
FIG. 3 is a sectional view of the hydraulic locking cylinder showing certain aspects of the hydraulic locking cylinder.

Details of the hydraulic locking cylinder are shown in FIGS. 3, 4 and 5. The hydraulic lock cylinder 12 includes a cylinder casing 30 having an attachment lug generally shown as 31 for securement to the frame of the loading dock. A cylinder rod 32 extends from the cylinder casing and is attached to the pivoting dock board. Within the cylinder casing, the cylinder rod has a piston head 34 which has been drilled to define the port generally indicated as 35. This port is closed by a low pressure check valve generally indicated as 56. The cylinder is closed by cap member 38 and a high pressure seal 39 is provided between the cylinder rod 32 and the cap 38.

The cylinder case below the piston head 34 defines a variable volume hydraulic fluid reservoir 44. This reservoir 44 receives any high pressure hydraulic fluid which passes through the high pressure check valve 52. This high pressure check valve can be opened by application of the manual release 54 or when the locking hydraulic fluid pressure exceeds a predetermined limit which effectively opens the check valve 52 (typically about 1000 to 1200 psi). The piston head 34 slides within the cylinder 36.

The cylinder 36 is open at the bottom and it can be seen that the reservoir 44 is in cylinder 36 below the piston head 34 and in the space above and below the cylinder 36. The reservoir 44 is connected to the air vent 60 at the one end of the locking cylinder and is generally at a high location. Any air entrapped in the hydraulic fluid contained within the reservoir will find its way to the vent 60 and effectively be eliminated from the hydraulic fluid. Note, that the high pressure fluid which passes through the high pressure check valve 52, enters the reservoir at a low position and any air or gas entrapped in the fluid will find its way to the vent 60 and thereby be eliminated. Entrapped air or gas adversely effects the operation of the cylinder.

The hydraulic locking cylinder provides a hydraulic lock against movement of the rod 32 in the direction generally indicated as 37 in FIG. 3. A high pressure hydraulic fluid circuit 50 is defined between the piston head 34, the portion of the cylinder 36 above the piston head and through a port arrangement generally shown as 51 in the upper part of the cylinder casing 30. The port or conduit 51 is connected to the hydraulic high pressure check valve 52. Should a trailer bed exert an upward force on the dock board, this force is initially opposed by the high pressure hydraulic fluid located within the high pressure circuit 50. Should the force exceed the pressure limit of the high pressure check valve 52, a small amount of hydraulic fluid passes through the check valve and enters the reservoir. Thus, the rod 32 can move outwardly or in an extending direction indicated by arrow 37 should the hydraulic pressure exceed the opening pressure of the high pressure check valve 52. Any air or gas entrapped in the hydraulic fluid passes through the check valve and will move upwardly passed the upper edge of the cylinder 36 and pass out of the hydraulic locking cylinder through the vent 60.

FIG. 5 shows a force 53 urging the piston rod 32 in a retraction direction and this force is generally unopposed by the cylinder. This action accommodates downward movement of the dock board, such as would occur when a fork lift truck is entering a trailer. The lower pressure check valve 56 is opened (typically at a very low pressure) and hydraulic fluid within the reservoir 44 passes through the port 35 provided in the piston head 34 and enters what was previously the high pressure circuit 50 which is now not under pressure. This is the action of the cylinder when a downward force is exerted on the dock board which is of a magnitude to overcome the spring bias of the dock board. Thus, the dock board moves under a controlled resistance downwardly as hydraulic fluid flows from the reservoir 44 into the high pressure circuit 50 although at this point in time, the high pressure circuit 50 is under no pressure.

The hydraulic cylinder as shown in FIG. 4 shows both the high pressure check valve 52 and low pressure check valve 56 closed. It can be appreciated that pressure within the high pressure circuit 50 will also serve to maintain the low pressure check valve 56 closed when there is a pressure in the high pressure circuit which exceeds pressure of the reservoir.

As can be appreciated from the above description, the dock board floats in position, due to the automatic operation of the dock valves, and assumes a position within a satisfactory, predetermined operating range.

The seals 46 provided between the piston rod 32 and the cylinder cap 38 stops air from entering or hydraulic fluid from leaving the high pressure circuit 50.

The purpose of the manual release 54 is to allow the operator to cause the dock board to move to the raised position such as would be the case when a trailer is about to leave the loading dock. In this case, the manual release 54 is actuated and as there should be no force on the pivoting dock board 6 other than its own weight and the spring bias, it will move upwardly under the influence of the spring bias 10 to the raised position generally shown in FIG. 1. The dock board is then positioned to allow an operator to lower the dock board once a trailer has been appropriately located. The dock board automatically adjusts for lowering of the trailer bed such as when the trailer is being loaded as the cylinder essentially allows controlled movement of the dock board downwardly. The hydraulic locking cylinder also allows for upward movement of the dock board should a force be exerted on the dock board which exceeds the pressure limits of the high pressure check valve 52. This arrangement provides a very reliable, convenient solution for allowing the conversion of a mechanical loading dock to a mechanical loading dock having an adjustable hydraulic lock.

This arrangement also defines a loop pumping circuit for the hydraulic fluid and allows any entrapped air or gas to be removed therefrom. In addition, all components are located within the cylinder structure which is mounted in the dock board as a variable length locking link.

A manual release mechanism can include a lever arrangement or an electrical arrangement (typically including a solenoid). The manual release is shown as 100 in FIGS. 1 and 3. The lever arrangement can be pivotally secured to the cylinder and provide a mechanical advantage for opening of the check valve. This mechanism is typically accessible at the rear of the dock board at the upper surface thereof.

Figure 6:
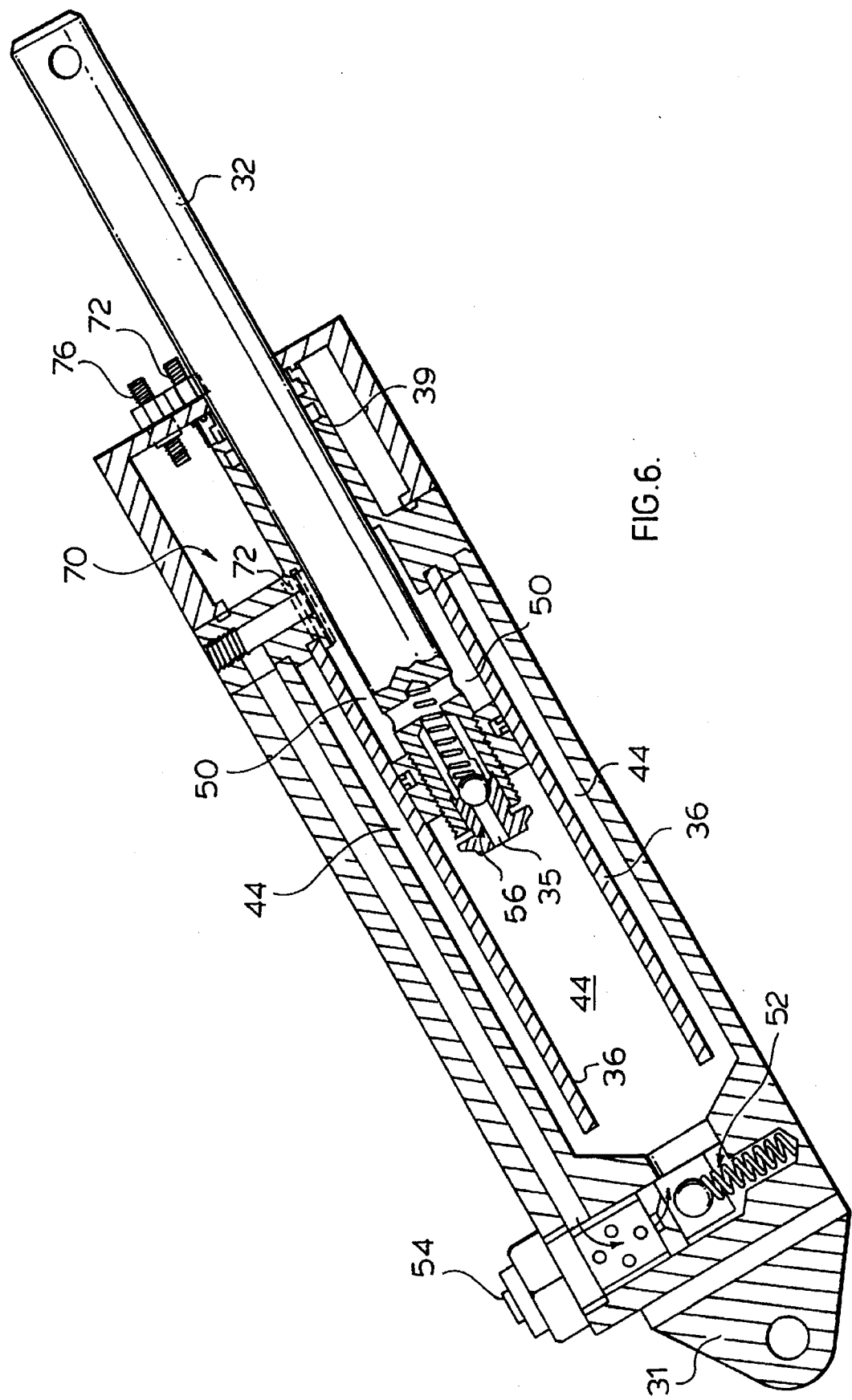
FIG. 6 is a sectional view of a further embodiment having an end reservoir.

An alternate structure is shown in FIG. 6 and differs from the structure of FIGS. 3 and 4, in that a reservoir extension 70 has been added and the vent 60 has been removed. The reservoir extension is connected to the variable volume hydraulic fluid circuit 44 by fluid passages 72. Excess hydraulic fluid is forced into the reservoir extension and a volume of air under low positive pressure maintains fluid circuit 44 flooded with hydraulic fluid. The intake breather valve 76 operates to take in air if a certain negative pressure (preferably 25 psi) in the reservoir extension. Release breather valve 78 operates to release pressure at about 25 psi. Each of these valves maintains the hydraulic fluid within the cylinder during shipping and minimizes leakage in shipping and allows the unit to be shipped in a condition ready for installation.

The reservoir is sealed by the two valves and therefore, can be shipped without leakage. At the time of installation, the unit is already filled and only needs to be installed. The dock board, after installation, is cycled several times during which either or both vents may operate due to the pressure conditions. Any air trapped in the fluid circuit accumulates in the reservoir. It has been found that the valves remain generally closed after the initial set up, and thus, the fluid circuit is effectively sealed thereby reducing contamination by drawing in air and dirt which can occur in the open system of FIGS. 3 through 5. As described above, the valved reservoir accommodates necessary changes in operating the system and effectively closes the hydraulic circuit during shipping or storage. At the time of manufacture, the unit is appropriately filled with the proper amount of hydraulic fluid and is tested. Satisfactory operation at this time strongly indicates the unit will properly function when finally installed.

The hydraulic locking arrangement, which does not require a separate power source, has been described with respect to the preferred embodiment where the reservoir and check valves and fluid circuit are all incorporated in a cylinder for mounting directly in the dock board and operable at various angles generally from horizontal to about a 60 degrees. This arrangement is preferred as it simplifies installation and is believed to reduce potential maintenance problems as all components are protected and move as a unit. It is possible to simplify the cylinder and provide a separate and distinct reservoir appropriately connected which operates in the manner described and as such is within the scope of the present invention.

The present invention also improves the operation of the manual mechanical dock board by providing an automatic adjusting or "floating" dock board which responds to reduced what would otherwise be damaging forces.

Although preferred embodiments of the invention have been described herein in detail, it would be understood by those of skill in the art, that variations may be made thereto without departing from the spirit of the invention and the scope of the appending claims.

What is claimed is:

1. Hydraulic locking arrangement for a loading dock having a pivotally mounted dock plate, said hydraulic locking arrangement controlling movement of said dock plate from a raised position to a lower trailer loading or unloading position, said hydraulic locking arrangement locking said dock plate against upward movement unless a predetermined pressure is exceeded, said hydraulic locking arrangement comprising a cylinder, a piston moveable within said cylinder, a closable hydraulic fluid circuit acting on one side of said piston, said closable hydraulic fluid circuit when closed opposing any forces urging movement of said piston in a direction to raise said dock plate and results in an increase of the hydraulic fluid pressure of said closable hydraulic fluid circuit, a hydraulic fluid reservoir, a high pressure check valve arrangement connecting said hydraulic fluid circuit with said reservoir, a low pressure check valve for accommodating retraction of said piston and supply of hydraulic fluid from said reservoir into said fluid circuit, and release means for opening said fluid circuit and accommodating movement of said piston as said dock platform is moved to the raised position;

said high pressure check valve arrangement opening to said reservoir when a predetermined pressure is exceeded in said hydraulic fluid circuit caused by said dock board being forced upwardly and automatically closing when the pressure is within acceptable operating pressure range and wherein said reservoir includes an air valve arrangement which regulates and limits the exchange of air between the reservoir and atmosphere.

2. Hydraulic locking arrangement as claimed in claim 1 wherein said high pressure check valve remains closed when acted on by a spring bias force on said dock platform urging it to an upward position and automatically opens at a higher pressure to avoid forces on said dock board which can damage the operation thereof.

3. Hydraulic locking arrangement as claimed in claim 1 wherein said fluid circuit forms a loop with said reservoir and said high pressure check valve is located at a position remote said piston and opens into said reservoir and said low pressure check valve is closely associated with said piston, and wherein said air valve arrangement effectively seals said fluid circuit from atmosphere thereby reducing contamination of the hydraulic fluid.

4. Hydraulic locking arrangement as claimed in claim 3 wherein said low pressure check valve opens at a pressure less than about 20 psi.

5. Hydraulic locking arrangement as claimed in claim 3 wherein said low pressure check valve opens at a pressure between about 2 psi and 20 psi.

6. Hydraulic locking arrangement as claimed in claim 3 wherein said high pressure check valve opens at a pressure of about 1000 psi.

7. Hydraulic locking arrangement as claimed in claim 1 wherein said release means is an actuator which opens said high pressure check valve.

8. Hydraulic locking arrangement as claimed in claim 1 wherein said release means is a pivotted lever arrangement which opens said high pressure check valve.

9. Hydraulic locking arrangement as claimed in claim 1 wherein said release means includes a solenoid for releasing said high pressure check valve.

10. Hydraulic locking arrangement as claimed in claim 1 wherein said check valves, said reservoir, said hydraulic circuit, said piston and said cylinder are all located in a common housing.

11. Hydraulic locking arrangement as claimed in claim 2 wherein said check valves, said reservoir, said hydraulic circuit, said piston and said cylinder are all located in a common housing.

12. Hydraulic locking arrangement as claimed in claim 3 wherein said check valves, said reservoir, said hydraulic circuit, said piston and said cylinder are all located in a common housing.

13. Hydraulic locking arrangement as claimed in claim 1 wherein said check valves, said reservoir, said hydraulic circuit, said piston and said cylinder are all located in a common cylindrical housing pivotally secured in said loading dock.

14. Hydraulic locking arrangement as claimed in claim 2 wherein said check valves, said reservoir, said hydraulic circuit, said piston and said cylinder are all located in a common cylindrical housing pivotally secured in said loading dock.

15. Hydraulic locking arrangement as claimed in claim 1 including a reservoir extension in fluid communication with said reservoir to accommodate an excess of hydraulic fluid available to said reservoir, said reservoir extension including said air valve arrangement.

16. Hydraulic locking arrangement as claimed in claim 2 including a reservoir extension in fluid communication with said reservoir to accommodate an excess of hydraulic fluid available to said reservoir, said reservoir extension including said air valve arrangement.

17. Hydraulic locking arrangement as claimed in claim 1 wherein said air valve arrangement has two air pressure valves, one of said pressure valves operating to vent air in said reservoir at a predetermined pressure and one of said air pressure valves operating to allow air into said reservoir at a predetermined negative pressure in said reservoir.

18. Hydraulic locking arrangement as claimed in claim 17 wherein said one pressure valve, which vents air from said reservoir, operates at a pressure of about 25 psi.

19. Hydraulic locking arrangement as claimed in claim 17 wherein said one pressure valve, which allows air into said reservoir, operates at a negative pressure of about 25 psi.

20. Hydraulic locking arrangement as claimed in claim 3 wherein said air valve arrangement has two air pressure valves, one of said pressure valves operating to vent air in said reservoir at a predetermined pressure and one of said air pressure valves operating to allow air into said reservoir at a predetermined negative pressure in said reservoir.

* * * * *